United States Patent [19]

Kumagai et al.

[11] Patent Number: 4,663,013

[45] Date of Patent: May 5, 1987

[54] CATION EXCHANGE MEMBRANE

[75] Inventors: Isao Kumagai, Tokyo; Makoto Kataoka, Tomano; Yuji Kinoshita, Okayama, all of Japan

[73] Assignee: Chlorine Engineers Corp. Ltd., Tokyo, Japan

[21] Appl. No.: 729,082

[22] Filed: May 1, 1985

Related U.S. Application Data

[63] Continuation of Ser. No. 492,573, May 9, 1983, abandoned.

[30] Foreign Application Priority Data

May 25, 1982 [JP] Japan ................................. 57-87318
May 25, 1982 [JP] Japan ................................. 57-87319

[51] Int. Cl.[4] ........................................... C25B 13/08
[52] U.S. Cl. .................................... 204/296; 204/283; 428/315.5; 428/247; 210/500.36

[58] Field of Search ............... 156/297.8, 304.1, 304.3, 156/304.6, 324, 157, 159, 72, 155; 210/500.1, 500.2, 638, 500.36; 204/252, 296, 283; 428/58, 61, 247, 419, 421–422, 315.5

[56] References Cited

U.S. PATENT DOCUMENTS

| | | | |
|---|---|---|---|
| 4,151,053 | 4/1979 | Seko et al. ............................ | 204/128 |
| 4,165,248 | 8/1979 | Darlington et al. ............. | 156/306.9 |
| 4,236,952 | 12/1980 | Krause et al. ........................ | 156/155 |
| 4,284,460 | 8/1981 | Moore et al. ..................... | 156/308.2 |
| 4,318,785 | 3/1982 | Guajima et al. ................. | 156/308.2 |
| 4,324,606 | 4/1982 | Withers ............................ | 156/308.2 |
| 4,339,549 | 7/1982 | Tsushima et al. .................. | 156/73.1 |

Primary Examiner—Donald Czaja
Assistant Examiner—Merrell C. Cashion, Jr.
Attorney, Agent, or Firm—Kuhn Muller and Bazerman

[57] ABSTRACT

A method of bonding a cation exchange membrane of the type having a perfluorosulfonic acid group on one face and a perfluorocarboxylic acid group on the other face, with a reinforcing mesh material embedded therein and a fluorine-containing resin sheet is disclosed.

4 Claims, 7 Drawing Figures 4,663,013

CATION EXCHANGE MEMBRANE

This application is a continuation of application Ser. No. 492,573 filed May 9, 1983 now abandoned.

BACKGROUND OF THE INVENTION

This invention relates to bonding of a cation exchange membrane and, more particularly, to the bonding of a cation exchange membrane and a fluorine-containing resin sheet which is to be installed in a chlor-alkali electrolyzer.

A fluorine-containing cation exchange membrane exhibits superior chemical resistance and mechanical strength when used as a diaphragm in the production of sodium hydroxide and chlorine from the electrolysis of brine by the ion exchange membrane process. This is especially true in cases of perfluorosulfonic acid type cation exchange membrane having sulfonic acid groups as the prevailing cation exchange group. The perfluorosulfonic acid type cation exchange membrane features low electrolytic voltage and tends to permeate hydroxide ions diffused from the cathode chamber to the anode chamber. This countermigration of hydroxide ions results in disadvantageously low current efficiency. To increase current efficiency, by resolving this weak point and to improve physical strength and, hence, dimensional stability, cation exchange membranes have been proposed in which a perfluorocarboxylic acid type ion exchange membrane is attached to the cathode side of the membrane, or the cathode side of the membrane is transformed into perfluorocarboxylic acid type by chemical treatment. A common practice for increasing strength of cation exchange membrane is to interpose mesh-state reinforcing material, such as a Teflon (Registered Trademark) mesh, between two layers of cation exchange membrane, or within the perfluorosulfonic acid type cation exchange membrane. Although the performance of this cation exchange membrane in brine electrolysis is excellent, the membrane is very costly. The need for a more economical solution is recognized by those skilled in the art.

An arrangement has been proposed, as shown in FIG. 1, in which the cation exchange membrane is shaped into a bag A. The anode B is positioned inside of the bag A. The cathode (not shown) is positioned outside the bag (Japanese Patent Laid Open Nos. 53-95899 and 53-106679). In this arrangement, however, the effective area of cation exchange membrane is composed only of the interleaved part by the anode and the cathode; the other remaining parts represent a non-contributive area to the electrolysis.

For this reason, for decreasing the membrane cost, discussions have suggested that only the part C, which is interleaved between the anode and the cathode, as shown in FIG. 2 and FIG. 3, be fabricated as the cation exchange membrane and that other parts D be fabricated from relatively low cost and highly chemical-resistant fluorine-containing resin.

However, an effective means has not been found for bonding the cation exchange membrane and fluorine-containing resin sheet directly to form a bag element composed of a cation exchange membrane and fluorine-containing resin sheet. Thus, the formation of a bag element as shown in FIG. 2 or FIG. 3, has in practice been impossible.

Further considerations are relevant to the fabrication of dual material bag elements. Before being installed in a chlor-alkali electrolyzer, a flat sheet of such cation exchange membrane may be shaped into bags, or films of it with small areas may be combined into a sheet of specified area and, in addition, damaged membranes must be repairable, by bonding.

In order to bond two partially overlapping ion exchange membranes at the overlapping part of heat bonding, it is necessary for sulfonic acid sides E and carboxylic acid sides F, respectively, to be bonded so that they have an identical direction, as shown in FIG. 4, and a sulfonic acid side E and carboxylic acid side F of the adjacent cation exchange membranes C are to be in contact with each other.

However, even if heat is applied with compression in the state as shown in FIG. 4, both cation exchange membranes C cannot be bonded due to the small affinity between carboxylic acid and sulfonic acid, or if bonded, the tensile strength to be attained will be extremely low. In contrast, sulfonic acid group has relatively strong affinity with sulfonic acid group and a bonded membrane with satisfactory strength can be obtained from partially overlapped sulfonic acid type cation exchange membranes.

SUMMARY OF THE INVENTION

The problem and disadvantages discussed above may be effectively surmounted by the practice of the invention. In accordance with the invention, a cation exchange membrane and fluorine-containing resin sheet is bonded, with satisfactory bonding strength, by heat bonding with perfluorosulfonic acid type cation exchange membrane in contact with the edges of the both materials.

Thus, in accordance with the present invention, there is a bonding of cation exchange membrane and fluorine-containing resin sheet, in which a cation exchange membrane having perfluorosulfonic acid group on one face, perfluorocarboxylic acid group on the other face and mesh-state reinforcing material being embedded, and a fluorine-containing resin sheet, characterized in that a bonding piece comprising perfluorosulfonic acid type cation exchange membrane is in contact with the edge of said cation exchange membrane and the edge of the fluorine-containing resin sheet so that at least a part of said bonding piece is overlapped with the perfluorosulfonic acid group side of said cation exchange membrane and fluorine-containing resin sheet, and the overlapped part is heat-bonded.

In accordance with a further feature of the invention, utilizing the fact that two perfluorosulfonic acid type cation exchange membranes can be bonded with each other with sufficient tensile strength by heat bonding, the cation exchange membrane having perfluorosulfonic acid group on one face and perfluorocarboxylic acid group on the other face and an embedded reinforcing mesh is bonded using sulfonic acid type cation exchange membrane. Namely, this aspect of the invention relates to bonding two side ends of cation exchange membrane by heat bonding in which the ends of cation exchange membrane having perfluorosulfonic acid group on one face and perfluorocarboxylic acid group on the other face and an embedded reinforcing mesh are fitted and bonding pieces comprising perfluorosulfonic acid type cation exchange membrane are placed on both faces of the fitted part.

Thus, the invention is directed to a method of bonding a cation exchange membrane having perfluorosulfonic acid group on one face, perfluorocarboxylic acid group on the other face, and a reinforcing mesh material embedded therein, with a fluorine-containing resin sheet, which comprises positioning a bonding piece comprising a perfluorosulfonic acid type cation exchange membrane in contact with the edge of the cation exchange membrane and the edge of the fluorine-containing resin sheet so that at least a part of the bonding piece is overlapped by the perfluorosulfonic acid group side of the cation exchange membrane and the fluorine-containing resin sheet, and heating the bonding piece so as to heat bond the overlapped part to the cation exchange membrane and the fluorine-containing resin sheet. The heating step includes heating the bonding piece at a temperature ranging from 200 degrees Celsium to 350 degrees Celsius under a surface pressure of 5 to 50 Kg/cm$^2$ for 5 to 120 seconds.

In accordance with an embodiment of the invention, a method of bonding a cation exchange membrane having perfluorosulfonic acid group on one face, perfluorocarboxylic acid group on the other face and a reinforcing mesh material embedded therein, which comprises abutting the end edges of a plurality of the cation exchange membrane, positioning bonding pieces on opposite faces of the membranes so as to overlay the abutted end edges, and heating the bonding pieces so as to heat bond the bonding pieces to the cation exchange membranes.

The various features of novelty which characterized the invention are pointed out with particularity in the claims annexed to and forming a part of this specification. For a better understanding of the invention, its operating advantages and specific objects attained by its use, reference should be have the accompanying drawings and descriptive matter in which there is illustrated and described preferred embodiments of the invention.

BRIEF DESCRIPTION OF THE DRAWINGS

In the accompanying drawings, forming a part of this specification, and in which reference numerals shown in the drawings designate like or corresponding parts through the same.

DETAILED DESCRIPTION

Figure 1:
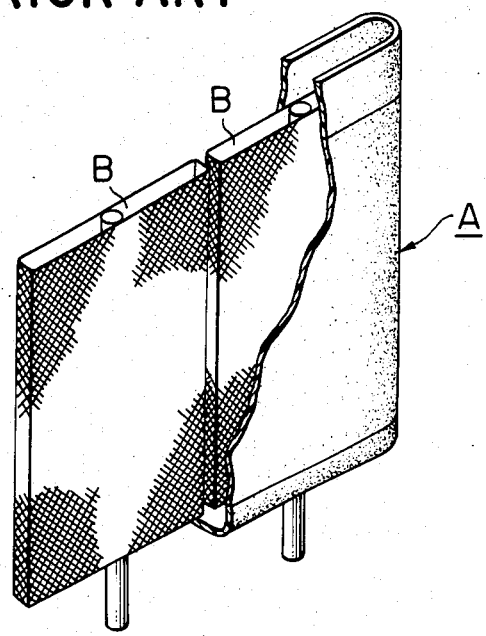
FIG. 1 is a partially broken-away schematic illustration showing a cation exchange membrane formed in the shape of a bag and installed in an electrolyzer.
Figure 2:
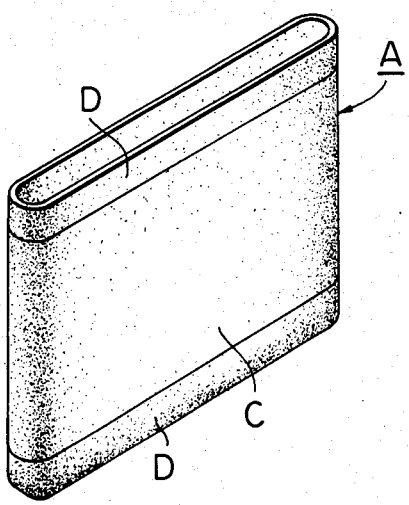
FIG. 2 is a schematic perspective illustration of a bag element according to a first design.
Figure 3:
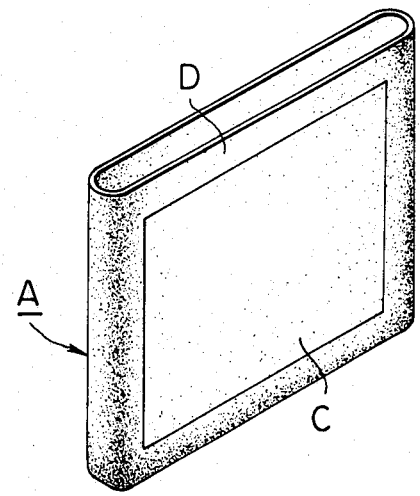
FIG. 3 is a schematic perspective illustration of a bag element according to a second design.
Figure 4:
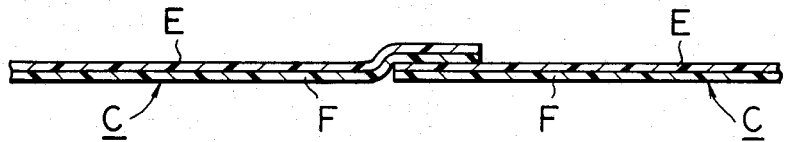
FIG. 4 is a sectional view of a conventionally bonded cation exchange membrane.
Figure 5:
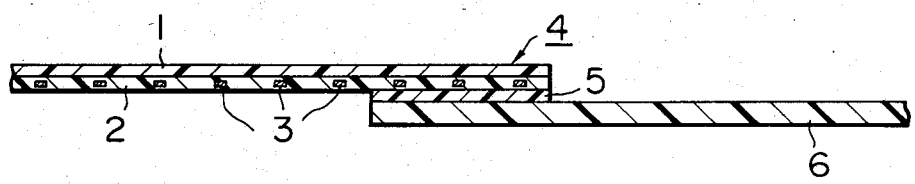
FIGS. 5 and 6 are sectional views of a cation exchange membrane and fluorine-containing resin sheet bonded in accordance with the invention.
Figure 6:
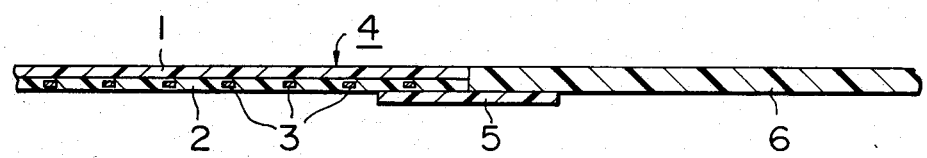

Referring now to FIG. 5 and FIG. 6, in particular, there is shown a bonded cation exchange membrane and fluorine-containing resin sheet using perfluorosulfonic acid type cation exchange membrane.

The perfluorocarboxylic acid type cation exchange membrane 1 is formed in the shape of a square sheet. A perfluorosulfonic acid type cation exchange membrane 2 having the same shape as the membrane 1 and embedded with a reinforcing mesh 3 comprising fluorine-containing resin therein is also provided. The cation exchange membrane 4 is composed of these three members.

A bonding piece 5 comprises a perfluorosulfonic acid type cation exchange membrane, and reference numeral 6 is a fluorine-containing resin sheet prepared by polymerizing one or more kinds of tetrafluoroethylene, hexafluoropropyrene, or vinylidene fluoride, or the like.

In FIG. 5, the bonding piece 5 is contacted with the edge on the sulfonic acid group side at the lower part of cation exchange membrane 4, and to this bonding piece 5, the fluorine-containing resin sheet 6 is contacted. By heat-bonding this contact part, cation exchange membrane 4 and fluorine-containing resin sheet 6 are bonded.

Figure 7:
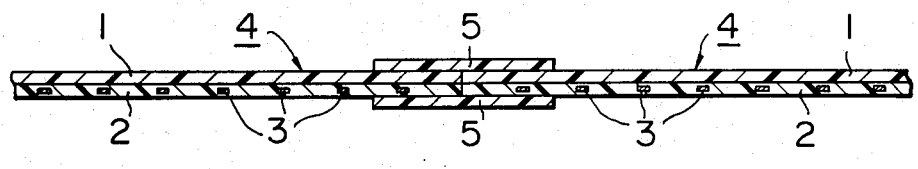
FIG. 7 is a sectional view of two cation exchange membranes bonded in accordance with the invention.

In FIG. 6, the edge of cation exchange membrane 4 and edge of fluorine-containing resin sheet 6 are abutted, and the back of the abutted parts, namely, the bonding piece is contacted from the sulfonic acid group side of the cation exchange membrane 4. By heat bonding this contacted part, the cation exchange membrane 4 and fluorine-containing resin sheet 6 are mutually bonded. An allowable alternative method is to contact the bonding pieces to the membrane not only from the back, but also from both front and back of the membrane as shown in FIG. 7. In FIG. 7, bonding pieces 5 comprising perfluorosulfonic acid type cation exchange membrane and being placed on both faces of a pair of cation exchange membranes 4, membranes 4 are fitted so that the perfluorosulfonic acid type cation exchange membrane 2 and the perfluorocarboxylic acid type cation exchange membranes 1 run toward the same direction, respectively, and are bonded by heating.

In the arrangement of FIG. 6, cation exchange membrane 4 and the bonding piece 5 are firmly bonded by affinity of sulfonic acid group of cation exchange membrane 4 and sulfonic acid group of the bonding piece 5, and thus, satisfactory tensile strength is attained. In addition, the reinforcing mesh 3 embedded in the cation exchange membrane 4 prevents the cation exchange membrane from deforming or losing strength by trapping, within its lattice, resin of cation exchange membrane 4 which fuses and leaks.

In the arrangement of FIG. 7, the sulfonic acid group of the lower bonding piece 5 is bonded with sulfonic acid group of perfluorosulfonic acid type cation exchange membrane 2 of cation exchange membrane 4 by the strong affinity, contributing directly to the bonding of the both cation exchange membranes 4, 4. While, the upper bonding piece 5 and the cation exchange membrane 4 are bonded by relatively weak force, the arrangement contributes to enhancing tensile strength, and though not contributing directly to the bonding of the both cation exchange membrane 4, 4, protects the contacting part by firmly interleaving the contact part and facilitating bonding work, as well. In addition, the reinforcing mesh 3 embedded in the cation exchange membrane 4 prevents the cation exchange membrane from deforming or losing strength by trapping, within its lattice.

In FIG. 5 and FIG. 6, the cation exchange membrane is prepared by combining perfluorosulfonic acid type cation exchange membrane and perfluorocarboxylic acid type cation exchange membrane. This invention, however, is not limited to such composite membrane, but is also applied to such cation exchange membrane as prepared by transforming one face of perfluorocarboxylic acid type cation exchange membrane into perfluorosulfonic acid type by chemical treatment, or prepared by the reverse processing. In addition, a reinforcing mesh can be embedded into the bonding piece to enhance the strength of the bonding part.

The bonding is preferably performed at 200°–350° C. surface pressure, 5–50 kg/cm², for 5–120 sec. If the bonding exceeds these upper process limits, the membrane deteriorates, and if exceeds the lower limits, sufficient bonding effect is not obtained. Both cases are not desirable.

This invention allows the costly cation exchange membrane and relatively low cost fluorine-containing resin sheet to be bonded easily and provides an economical way of forming specified shapes in which only the necessary parts are fabricated with cation exchange membrane and other parts with fluorine-containing resin sheet.

EXAMPLE I

Between the edge of Nafion (Registered Trademark) #901 sheet by Du Pont comprising a composite membrane of perfluorocarboxylic acid type cation exchange membrane sheet and perfluorosulfonic acid type cation exchange membrane sheet with a reinforcing mesh embedded therein, and the periphery of opening part of fluorine-containing resin sheet comprising a copolymer of tetrafluoroethylene and hexa fluoropropylene (FEP) having an opening at the upper part and square openings on the both faces, a bonding piece comprising perfluorosulfonic acid type cation exchange membrane is sandwiched. The bonding piece is heat-bonded at 13 kg/cm² surface pressure, 260° C. applied on the Nafion #901 side, 310° C. on FEP side, for 35 seconds. The tensile strength per unit width was 4.0 kg/cm-width.

This bag shape element was installed to a chlor-alkali electrolyzer in such a manner that the bag enclosed the anode element and operated for one year at cell temperature 85° C., feed brine concentration 300 g/l, anolyte brine concentration 220 g/l and sodium hydroxide concentration 32%. After the one year operation, the bag element showed no change in tensile strength and bonding effect.

In FIG. 7, the cation exchange membrane is prepared by combining perfluorosulfonic acid type cation exchange membrane and perfluorocarboxylic acid type cation exchange membrane. This invention, however, is not limited to an embodiment of such composite membrane, but is also applied to such cation exchange membrane as prepared by transforming one face of perfluorocarboxylic acid type cation exchange membrane into perfluorosulfonic acid type by chemical treatment, or prepared by the reverse processing. In addition, reinforcing mesh can be embedded into the bonding piece to enhance the strength of the bonding part.

Thus, in accordance with the invention, it is possible to fabricate a cation exchange membrane having perfluorosulfonic acid group on one face and perfluorocarboxylic acid group on the other face, and the internally embedded reinforcing mesh, into any shape with strong bonding effect by using bonding pieces comprising perfluorosulfonic acid type cation exchange membrane and utilizing the affinity of same groups of sulfonic acid. Moreover, by bonding the bonding pieces not only on one face of the fitting part of the cation exchange membrane but also the other face, the fitting of the cation exchange membrane is protected and bonding work is facilitated.

EXAMPLE II

A pair of the ends of Nafion (Registered Trademark) #901 sheet by Du Pont comprising composite membrane of perfluorocarboxylic acid type cation exchange membrane sheet and perfluorosulfonic acid type cation exchange membrane sheet with a reinforcing mesh embedded therein were abutted, and along the both faces of the abutted parts, strip sheets of Nafion #324 by Du Pont which were perfluorosulfonic acid type cation exchange membrane were placed, and these strip sheets and said cation exchange membrane sheet were bonded at 23 kg/cm² of face pressure, at 230°–240° C. for 60 sec.; then, successively and rapidly cooled to 100° C. The obtained tensile strength was 5.0 kg/cm-width per unit width of the bonding part.

This bonded membrane was installed to a chlor-alkali electrolyzer and after the operation for one year at the cell temperature 85° C., feed brine concentration 300 g/l, anolyte brine concentration 220 g/l, and sodium hydroxide concentration 32%, the tensile strength of the bonding part was 4.9 kg/cm-width, giving no problem at the bonded part.

What is claimed is:

1. A composition cation exchange membrane comprising in combination:
   first and second cation exchange membrane portions, each having perfluorosulfonic acid groups on one face, perfluorocarboxylic acid groups on the other face, and a reinforcing mesh material embedded therein, and the respective faces of said portions carrying the perfluorosulfonic acid groups facing in the same direction; said membrane portions being in edge-to-edge contact; and at least one bonding piece comprising a perfluorosulfonic acid type cation exchange membrane, being in overlying relationship with the said membranes at the edge-to-edge meeting line thereof, and being heat bonded to the perfluorosulfonic acid group faces of said two portions at the zone abounding said meeting line.

2. A composite cation exchange membrane in accordance with claim 1, including a further said bonding piece, which is heat bonded to the perfluorocarboxylic acid group faces of said two portions at the said zone of meeting.

3. A composite cation exchange membrane and fluorine containing resin sheet comprising in combination:
   a cation exchange membrane having perfluorosulfonic acid group on one face, perfluorocarboxylic acid groups on the other face, and a reinforcing mesh material embedded therein;
   a fluorine-containing resin sheet in edge-to-edge contact with said cation exchange membrane material; and
   a bonding piece comprising a perfluorosulfonic acid type cation exchange membrane heat bonded to the perfluorosulfonic acid group side of said cation exchange membrane and to the abutting face of said resin sheet at the zone abounding the edge-to-edge contact line therebetween.

4. A composite cation exchange membrane and fluorine-containing resin sheet comprising in combination:
   a cation exchange membrane having perfluorosulfonic acid groups on one face, perfluorocarboxylic acid groups on the other face; and a reinforcing mesh material embedded therein;

a fluorine-containing resin sheet being in overlapping relationship to the perfluorosulfonic acid group containing face of said cation exchange membrane toward one edge thereof; and a bonding piece comprising a perfluorosulfonic acid type cation exchange membrane being sandwiched between the said cation exchange membrane and the overlapped resin sheet at the zone of overlap, and being heat bonded to each of said membrane and resin sheets at the zone of overlap.

* * * * *